(No Model.) 2 Sheets—Sheet 1.

A. L. ROSSETTI.
Gas Stove.

No. 233,283. Patented Oct. 12, 1880.

Witnesses
Geo. W. Egleston
F. S. Eastman

Inventor
A. L. Rossetti
per Orazio Lugo
Attorney

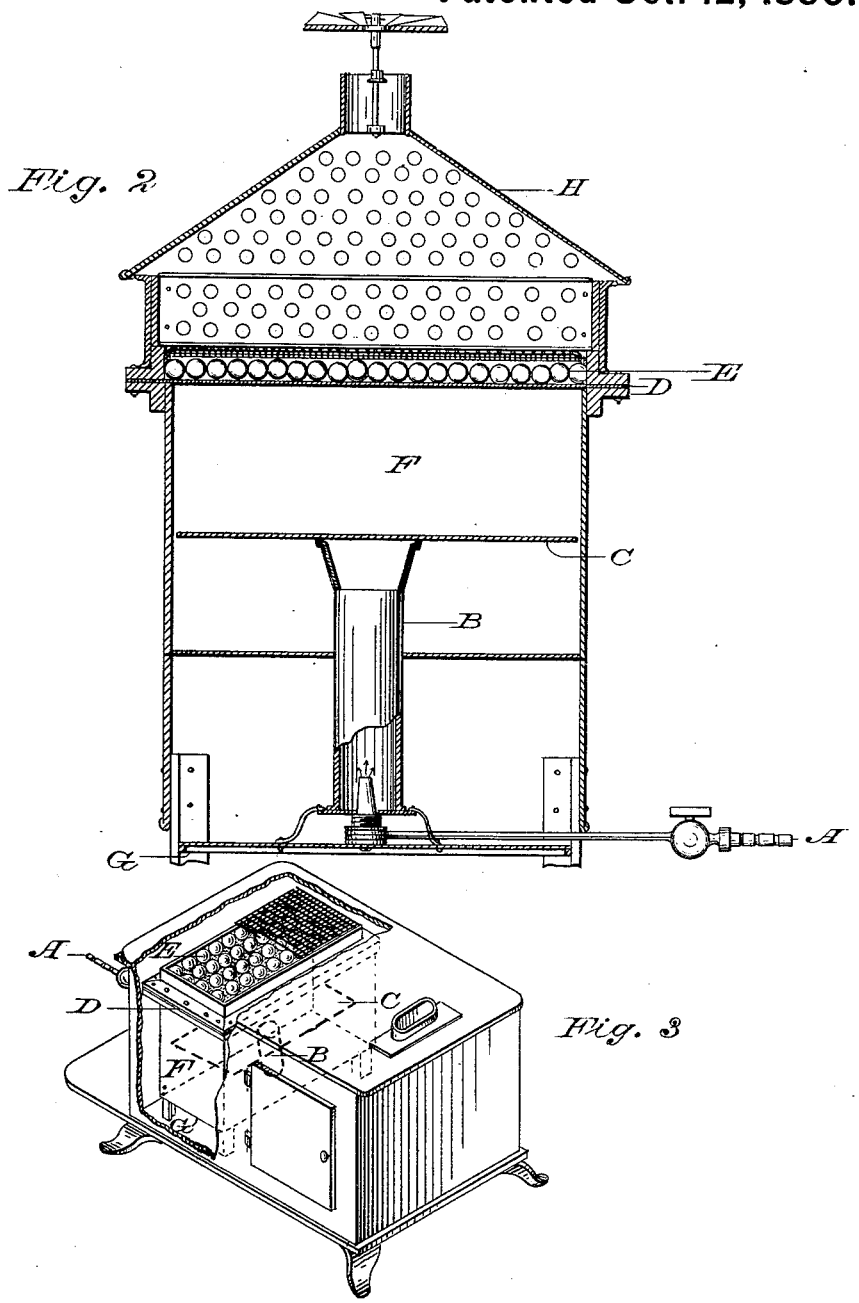

UNITED STATES PATENT OFFICE.

ANTONIO L. ROSSETTI, OF NEW YORK, ASSIGNOR OF ONE-HALF OF HIS RIGHT TO ORAZIO LUGO, OF FLUSHING, N. Y.

GAS-STOVE.

SPECIFICATION forming part of Letters Patent No. 233,283, dated October 12, 1880.

Application filed April 10, 1880. (No model.)

*To all whom it may concern:*

Be it known that I, ANTONIO LUIGI ROSSETTI, residing at New York city, county and State of New York, have invented a new and useful Improvement in Stoves for the Combustion of Gas, of which the following is a specification.

Heretofore gas has been used for heating and cooking purposes, either by previously mixing the gas with air, as is the case of the Bunsen burner, or by introducing a jet of gas into a box or cylinder the upper part of which is covered by a wire-cloth or perforated metallic material, or by directly burning the gas from a common gas-burner.

In all the methods thus far in use the combustion of the gas is very imperfect, and the products of the imperfect combustion are very injurious to health when the gases are not carried off by good ventilation. Besides, a great part of the heating power the gas may be capable of developing is lost, thus rendering the use of gas for heating purposes very costly, and limiting its useful applications to a few instances.

The object of my invention is to thoroughly burn the gas, whereby no injurious emanations will be evolved, and to develop the full heating power the gas is capable of producing, rendering possible the heating of rooms, houses, and cooking, &c., by gas in an economical manner.

To carry my invention into effect I combine the principle of the Bunsen burner with the method of burning gas by mixing it with air in a box or cylinder covered with wire-cloth or perforated metallic substances, and I place a refractory material over the wire-cloth, and below the wire-cloth a reflector, which serves both to deflect and mix the ascending currents of air and gas, and also to reflect upward heat radiated from the refractory material when it is in a heated condition, as will be hereinafter specifically described, reference being had to the accompanying drawings, in which—

Figure 1:
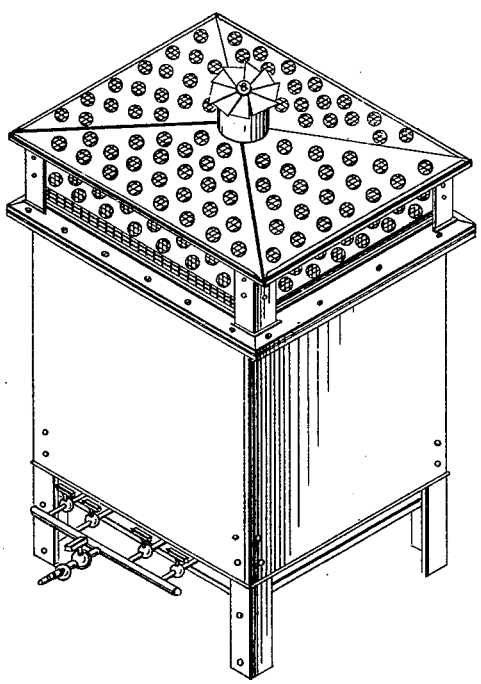

Figure 1 is a perspective view of my apparatus for burning gas constructed for heating rooms; Fig. 2, an elevation of the same in section; Fig. 3, a perspective view of my apparatus, partly in section, applied to cooking-stoves or ranges.

In Fig. 2 A represents a gas-supply pipe, one-eighth of an inch in diameter, entering the tube B at its lower end. The tube B is two inches in diameter and eight inches long, and is placed in the middle of the box F. At the upper end of the tube B there is a metallic deflector or reflector, C, twelve and one-half inches long and six and one-half inches wide. The reflector C is supported by the tube B.

F is a metallic box, (which might be made in cylindrical or other form,) thirteen inches long, seven inches wide, and eight inches high, open at its lower end, and covered at its upper end by wire-cloth or perforated metallic material D. On the wire-cloth D is placed a refractory material, E, such as pieces of fire-bricks or asbestus.

G is a metallic reflector, placed a few inches below the box F, to which is fastened the tube B. H is a movable cover, with sufficient apertures to allow the products of combustion to pass freely through it.

When the gas is turned on at the pipe A it enters the tube B, inducing an upward current of air in the tube B. The mixture of gas and air, in leaving the tube B, meets the deflector C, and is deflected equilaterally in the box F, and finally passes through the wire-cloth D of the box F, where it is lighted. Placed on the wire-cloth D of the box F is a refractory material, such as pieces of fire-bricks E. These latter become in a very short space of time incandescent and radiate a great amount of heat downward into the box F, heating the mixture of gas and air coming from the tube B to a very high temperature before the mixture passes through the wire-cloth D. As soon as the heated mixture of gas and air has passed through the wire-cloth D it comes in contact with the red-hot fire-bricks, and the result is a complete combustion of the gas without visible flame.

Figure 4:
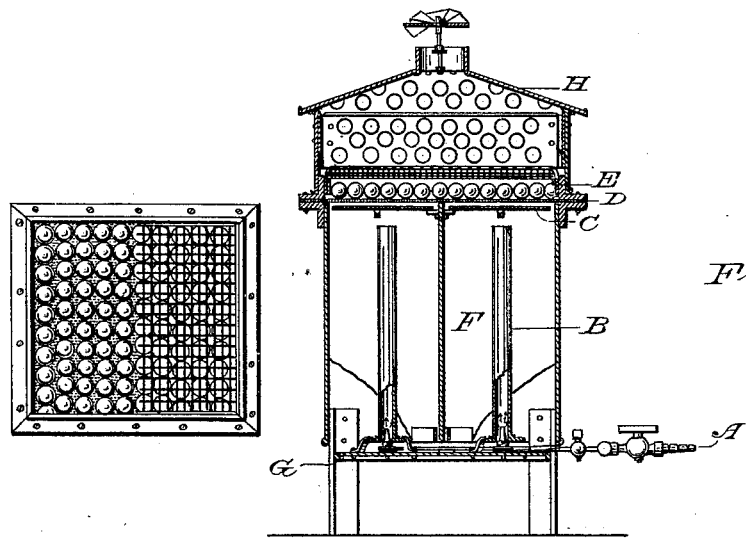

Several gas-burners can be applied in one stove, as in Fig. 4.

The dimensions given above are those with which I obtained very satisfactory results; but I do not limit myself to any size, especially as the proportions must necessarily vary with the size and object of the apparatus. For instance, when the apparatus or gas-stove is applied to a cooking-stove or range the dimensions must correspond with the size of the same.

In Fig. 3 it is shown that my gas-stove can be applied to a range or cooking-stove previously used for burning coal. This I accomplish by placing in the fire-box of the range or stove my apparatus for burning gas, thus saving the expense of buying a new stove, and at the same time facilitating the use of gas instead of coal or wood.

I have tried to burn gas with all the methods in use, and have found that not only did part of the gas escape combustion altogether, but that a large amount of carbonic oxide was always produced.

With my gas stove or apparatus for burning gas the combustion is perfect, and when the gas is a pure carburet of hydrogen the products of combustion are water and carbonic acid without a trace of carbonic oxide.

I am aware that gas-burners or gas-jets have been located beneath refractory material supported upon gauze; but it will be observed that in my construction a heating-chamber is formed between the mixing-chamber of the Bunsen burner and the refractory material by means of a deflecting-plate whose upper surface is a reflector.

Having described my invention, what I claim, and desire to secure by Letters Patent of the United States, is—

1. The combination, in a gas-stove, of a Bunsen burner, a reflector, a wire-gauze, and refractory material supported thereon, substantially as set forth.

2. In a gas-stove, the Bunsen burner B, the metallic reflector C, with the box F, all substantially as described, in combination with the refractory substance E and the wire-cloth or perforated metallic material D, for the purpose specified.

A. L. ROSSETTI.

Witnesses:
G. S. EVANS,
ORAZIO LUGO.